Nov. 4, 1958     C. W. DOEPKE ET AL     2,858,949
SUSPENDED DISPENSING MECHANISM
Filed Feb. 6, 1957     4 Sheets-Sheet 1

INVENTORS.
Charles Wm. Doepke.
BY Blaine S. Aston.
Wood, Herron & Evans.
ATTORNEYS.

United States Patent Office 2,858,949
Patented Nov. 4, 1958

2,858,949

SUSPENDED DISPENSING MECHANISM

Charles W. Doepke and Blaine S. Aston, Cincinnati, Ohio, assignors, by mesne assignments, to Nestier Corporation, Cincinnati, Ohio, a corporation of Ohio Application February 6, 1957, Serial No. 638,657

9 Claims. (Cl. 214—314)

This invention relates to a dispensing mechanism for delivering metal parts, such as stampings, bolts, nuts and the like which are used in large quantities along the assembly lines of industrial plants. The mechanism is intended particularly for plants in which the assembly lines extend along a considerable number of assembly stations at which points the various types of parts must be dispensed continuously, such as the assembly line of an automobile plant.

One of the primary objectives of the present invention has been to provide a self-contained dispensing mechanism which is suspended from an overhead rail structure, such that a series of dispensing units may be erected along the assembly line in a convenient manner, precisely at the required assembly stations, thereby to provide efficient, continuous delivery of parts to the workers at the several stations.

The mechanism of this invention follows the concept disclosed in the co-pending application of Charles Doepke et al. Serial No. 557,480, in that it includes a roll-over hopper and associated loading conveyor. However, in the prior structure, these parts are mounted upon a framework which rises from the floor, the structure being intended primarily to serve as an intermediate dispenser for feeding small parts into individual portable receptacles which are then distributed to the respective assembly stations. On the other hand, the present structure is intended for plants where the operations are best carried out with complete roll-over hopper assemblies located at the individual stations.

According to the present concept, each dispensing unit comprises a hanger structure which provides a hook-on attachment with a pair of over-head suspension rails, a roll-over hopper pivotally carried by the hanger structure and a loading conveyor carried by the hanger structure and extending rearwardly from the hopper. A storage conveyor is mounted upon the floor beneath each suspended dispenser unit. According to this concept, the dispenser unit is suspended at an elevation most convenient to the workers, while the space beneath the unit is available for the storage of loaded containers which may be hoisted from the storage conveyor directly to the suspended unit as the supply is exhausted from time to time.

As outlined in the prior application, the parts are confined in fairly large bulk containers, such as cartons, boxes or kegs which are quite heavy and difficult to handle. However, since a power crane or the like usually is available in the plant, a great deal of manual effort and handling time is eliminated by utilizing the power crane to elevate the loaded containers to the loading conveyor. After the container is placed on the conveyor, which is preferably of the roller type, the container may be advanced without a great deal of effort into the roll-over hopper which includes a corresponding conveyor section forming an endwise extension of the loading conveyor. After the container is advanced into the hopper, the hopper is pivoted without a great deal of effort to an inverted dispensing position, causing the parts to flow by gravity to a chute when they are dipped out by the worker as needed.

According to the present concept, a supply of parts may be transported to the storage conveyors which reside beneath each dispensing unit at a time when the assembly line is shut down, so as to avoid interference with the workers. The storage conveyors may be loaded rapidly and efficiently, utilizing fork-lift trucks or the like to transport and deposit the containers upon the conveyors. The reserve supply may be sufficient for a given period of operation, for example, one working day; accordingly, the dispensing unit may be replenished from the reserve supply rapidly and conveniently by the worker or attendant without interrupting the assembly operations along the line. Since each assembly station along the line is similarly equipped, the entire line is kept in continuous operation, even though relatively large parts, which ordinarily would require frequent replenishment, are assembled at many of the stations.

Another objective of the invention has been to provide a roll-over hopper which coacts with a stationary dispensing spout forming part of the self-contained unit, the spout of the roll-over hopper creating a continuation of the stationary chute when inverted to its dispensing position. By this arrangement, a residual supply of parts remains in the stationary chute when the hopper is pivoted back to its loading position; hence, the parts may be dipped from the stationary chute while the hopper is being reloaded.

A further advantage of the present structure arises from the fact that the self-contained dispenser units are simply hooked to the overhead rails and may be installed simply and efficiently by elevating several units to the rails and hooking them in place at required stations. If necessary, each unit may be skidded precisely to the position most convenient to the operator to provide the most efficient working conditions. The storage conveyors likewise are unattached and may be located in positions along the floor to best service the respective dispensing units. If a change is made in the assembly procedure, then it is a simple matter to rearrange the units to accommodate the changed working conditions.

In the preferred embodiment disclosed herein, each unit is suspended by a pair of hangers which are generally U-shaped as viewed from the side, the roll-over hopper being pivoted upon a mounting structure attached directly to the forward portion of the hangers at the lower end thereof. The loading conveyor extends in a horizontal plane rearwardly from the roll-over hopper, and is attached directly to the horizontal portions of the hangers along opposite sides. The upper ends of the hangers include hooks which fit snugly over the overhead rails and thus support the units but permit them to be shifted along the rails as needed. The storage conveyors, which utilize the space beneath the suspended unit, are of the gravity roller type and extend rearwardly beyond the outer ends of the loading conveyor such that the loaded containers at the rearward end are conveniently elevated to the rearward end of the loading conveyors.

In the present embodiment, auxiliary hoppers for small parts are provided for detachable connection to the stationary dispensing chutes. These hoppers are utilized at such stations where relatively small parts are utilized, for example, small washers which are used with the larger parts being assembled. The auxiliary hoppers may also be utilized to store an additional reserve supply of parts for use during the loading period when the roll-over hopper is pivoted to its upright loading position.

The various advantages of the invention will be more fully apparent from the following description taken in conjunction with the attached drawings.

*General arrangement*

Figures 1, 2, 3, 12:
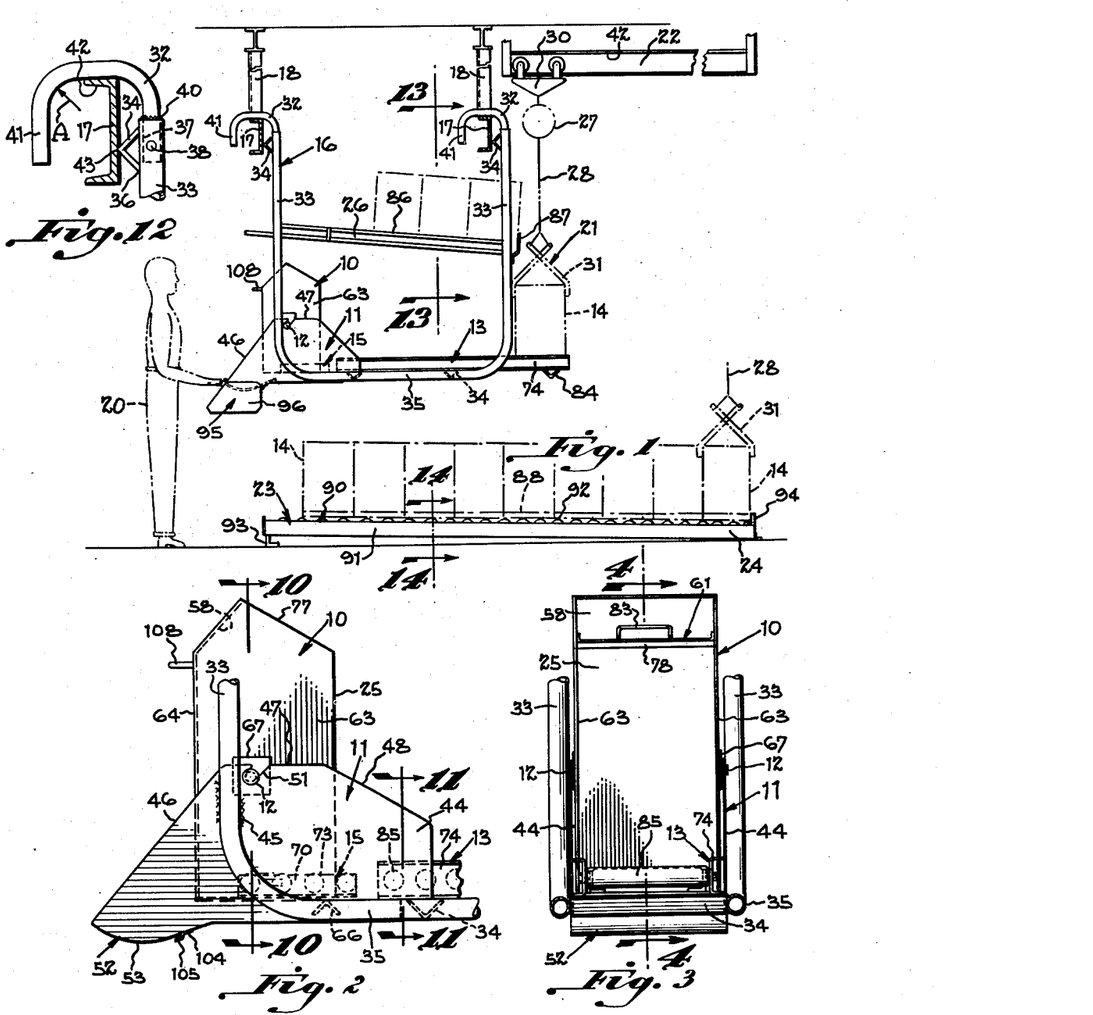
Figure 1 is a general side elevation of the suspended roll-over dispending unit showing the hopper pivoted to its upright position to receive a container of parts which is hoisted to the rearward end of the loading conveyor.
Figure 2 is an enlarged fragmentary side view taken from Figure 1, further illustrating the roll-over hopper and its mounting structure.
Figure 3 is a rearward elevation of the hopper and its mounting structure as projected from Figure 2.
Figure 12 is an enlarged fragmentary view taken from Figure 1, detailing the hook construction of the hanger.

Described wtih reference to Figure 1, the present dispensing mechanism comprises a roll-over hopper indicated generally at 10, pivotally cradled upon a base structure 11 by trunnions 12. The hopper 10 is shown in its upright loading position, with its open side facing the roller-type loading conveyor 13, such that the bulk parts container 14 may be advanced along the loading conveyor 13 directly upon a similar conveyor section 15 which is mounted in the bottom of the hopper. Upon being loaded as in Figure 4, the hopper is pivoted about its trunnions to the inclined parts dispensing position shown in Figure 5.

As shown in Figure 1, the dispensing mechanism is supported from above by a pair of hangers 16—16 which are generally U-shaped as viewed from the side. The hangers are suspended from a pair of longitudinal overhead rails comprising channel members 17—17, each channel member being attached to a respective vertical support 18 depending from the upper portion of the building structure. It will be understood at this point that the hangers 16 support the base 11, hopper 10, and loading conveyor 13 in rigid assembly as a self-contained unit and that the units may be suspended in battery formation at required assembly stations along a production line.

The hangers have a length related to the building height to support the dispensing unit at an elevation most convenient to the operator, as indicated at 20 in broken lines (Figure 1). The bulk containers 14, which are usually loaded with metal parts, are quite heavy, and for this reason, they are elevated to the loading conveyor 13 by a hoist mechanism indicated generally at 21. The hoist mechanism is of a conventional type with which most plants are equipped, and may include a transverse track 22 moveably suspended from an overhead hoist rail (not shown) which extends longitudinally along the assembly line, so as to serve a series of dispensing units spaced along the line.

As shown in Figure 1, each dispensing mechanism includes an inclined storage conveyor 23 of the gravity roller-type, mounted upon a floor alongside or beneath the suspended dispensing unit in a position which offers no interference to the operator. The rearward end of the storage conveyor extends outwardly beyond the dispensing unit as at 24, such that a line of loaded containers may be stored beneath each dispenser unit. The reserve supply of loaded containers 14 may approximate the parts requirements for a given period of operations, for example, one day or one working shift, such that the assembly line need not be shut down for replenishment of parts. The storage conveyors therefore assure that an adequate supply of parts is available along the entire production line, thereby to eliminate delays due to lack of parts at one or more of the stations. For rapid convenient handling, the parts containers may be placed upon pallets and transported to the storage conveyors 23 by means of fork-lift trucks, as explained later.

When a given hopper 10 is emptied (Figure 5), the worker at the station pivots the hopper back to its upright loading position (Figure 4) for removal of the empty container from the open side 25 of the hopper. The empty container may then be placed on a storage rack 26 (Figure 1), which is carried upon the hangers 16 above the hopper. The hoist mechanism 21 is then advanced along its overhead rail to that particular station, with its transverse track 22 located above the storage conveyor. As shown diagrammatically in Figure 1, the hoist mechanism includes a motor-driven hoisting winch 27, including a cable 28, suspended from track 22 by a trolley 30. A cramping tongs 31, suitable to engage the containers, is suspended from the hoist cable.

To transfer a loaded container 14 from the storage conveyor 23 to the loading conveyor 13, the tongs 31 is lowered and placed in engagement with the loaded container at the outer end 24 of the storage conveyor, as indicated at broken lines in Figure 1. The winch 27 is then operated to elevate the container to the rearward end of loading conveyor 13 to be advanced into the roll-over hopper after the cramping tongs is disengaged.

To provide flexiblity in the location of the assembly stations, the overhead channel members 17 preferably extend continuously along the assembly line. The hangers 16 include respective hooks 32 (Figure 12) at their upper ends, which provide a hook-on connection with the channels. Accordingly, a series of dispensing units may be erected in a very simple manner at the required stations along the line utilizing, for example, a fork-lift truck to transport and elevate the units to the channels. Upon engagement of the hooks, the individual units may be skidded along the channels precisely to the position most convenient for that particular operation; moreover, each unit subsequently may be shifted to a new position as desired, since the hooks eliminate the need for rigid connection with the channels.

The storage conveyors 23 preferably are unattached, such that they also may be shifted along the floor to the most desirable position relative to the dispensing unit. By properly relating the number of storage conveyors at the several stations to the size of the parts being assembled at those stations, a substantially equal quantity of parts may be deposited at each station at the beginning of the day's run.

*Structural details*

In the present disclosure, each hanger 16 is fabricated from tubular metal stock, the vertical limbs 33 being spaced apart a distance corresponding to the spacing of the overhead channels 17, as shown in Figure 1. As shown, each pair of hangers is tied together by transverse cross braces 34, there being provided in the present example, four braces, two of which are attached to the upper ends of the limbs 33, the other two braces extending between the horizontal portions 35 of the hangers. The cross braces are in the form of angle irons, the upper braces, which are attached to the limbs 33 being turned to a canted position and serving as stop elements with respect to the overhead channels 17, as explained later. The upper braces extend across the forward faces of the limbs 33 and the edges of the angle irons, which intersect the limbs, are welded thereto as at 36 (Figure 12). The lower cross braces and their opposite ends are butt welded to the horizontal portions 35 of the hangers.

As detailed in Figure 12, each hook 32 includes a vertical shank 37 telescopically interfitting the upper end of the vertical limb 33 of the hanger and secured by a rivet 38. In addition, the hanger may be additionally secured by welding as at 40. Each hook, in combination with its upper cross brace 34, is configurated to fit snugly over its supporting channel 17, such that the dispensing unit is suspended firmly in position. For this purpose, as detailed in Figure 12, each hook has a depending outer end 41, overhanging the top web 42 of channel 17. The depending portion 41 is delineated by an internal radius indicated at A which blends into the horizontal portion of the hook. A similar radius joins the straight portion with the vertical shank 37 of the hook.

It will be noted in Figure 12, that the corner 43 of the upper cross brace 34, by virtue of its canted position, provides a line contact with the web of channel 17, and that the radius A, previously noted, blends into the hook at a point which coincides approximately with the upper edge of the channel in the position shown. Accordingly, when the hook is placed over the channel, the internal radius A, under the weight load of the dispenser, cams against the forward edge of the channel and thus forces the hook forwardly to bring the corner 43 of the angle iron into engagement with the channel. The hook construction is identical for the limbs of each pair of hangers, such that each dispensing unit is snugly suspended at four points from the overhead channels 17.

The base structure 11, which cradles the roll-over hopper 10, comprises a pair of side plates 44 (Figure 10) formed of heavy gauge sheet metal. Each side plate 44 is welded as at 45 (Figure 2) to the inside surface of its hanger at the forward juncture of the horizontal portion 35 and vertical limb 33 of the hanger. This juncture is delineated by a relatively large radius, and thus provides a rigid support for the side plates. As viewed from the side, the forward edge 46 of each side plate converges upwardly to a horizontal top edge 47, the rearward edge 48 being inclined downwardly and vertically to the opposite sides of the loading conveyor 13 (Figure 2). It will be noted in Figure 4, that the lower rearward corner of each side plate is notched as at 50 to provide clearance for the lower cross brace 34 which has its opposite ends butt welded directly to the hangers as noted above. The upper edge 47 of each side plate includes an open slot 51 in which the trunnions 12 of the roll-over hopper are rotatably journalled.

Figure 5:
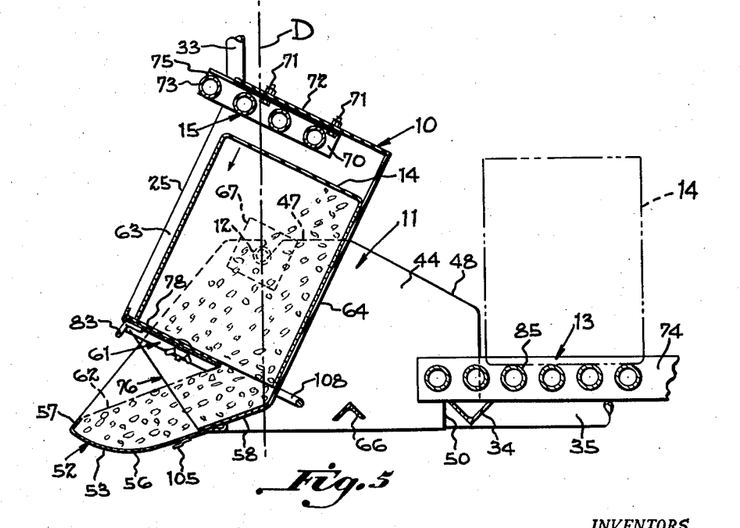
Figure 5 is a sectional view similar to Figure 4, showing the hopper pivoted to its inverted dispensing position.
Figure 6:
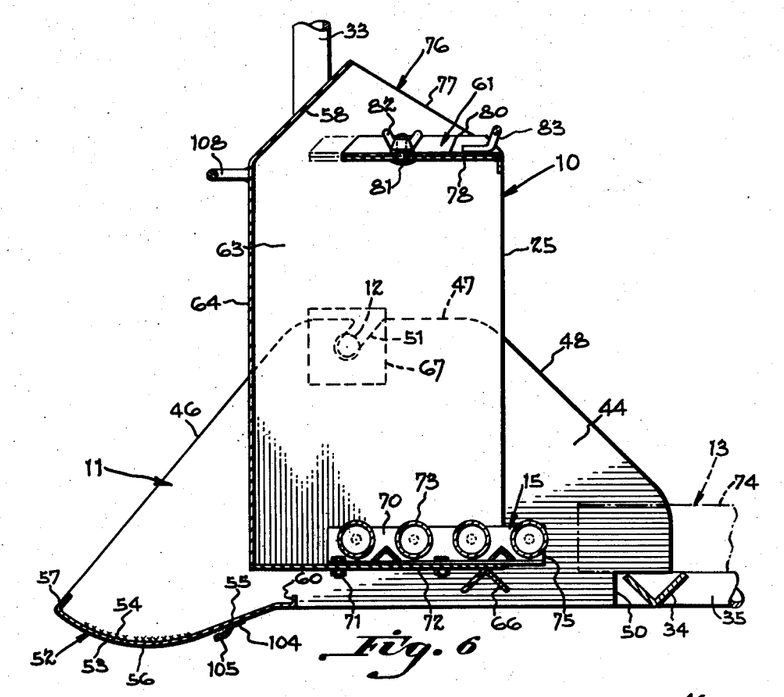
Figure 6 is an enlarged sectional view similar to Figure 4, further detailing the construction of the roll-over hopper.

As best shown in Figure 6, the forward portion of the base structure comprises a fixed dispensing chute indicated generally at 52. The chute is delineated by a bottom plate 53 formed of sheet metal having its opposite edges welded as at 54 to the side plates 44. As viewed from the side, the plate 53 includes a downwardly inclined portion 55 joined by a curved section 56 which rises to an upstanding lip 57 at the forward edge of the chute. When the hopper is in its inclined dispensing position (Figure 5), the flow plate 58 of the hopper forms a continuation of the inclined portion 55 of the chute, such that the parts flow from the container 14 to the curved section 56 of the chute. The rearward edge of the inclined plate 55 also includes an upstanding lip 60, which contacts the flow plate 58 of the hopper when in the inclined dispensing position.

As explained later, the hopper includes an adjustable gate 61 which coacts with the forward lip 57 to regulate the angle of repose of the parts as they flow from the hopper, as indicated by line 62 in Figure 5. It will be seen that the open chute 52 thus presents the parts in such position that they may be conveniently dipped out by hand, the supply being replenished by gravity flow from the inverted container 14 within the hopper.

Figure 4:
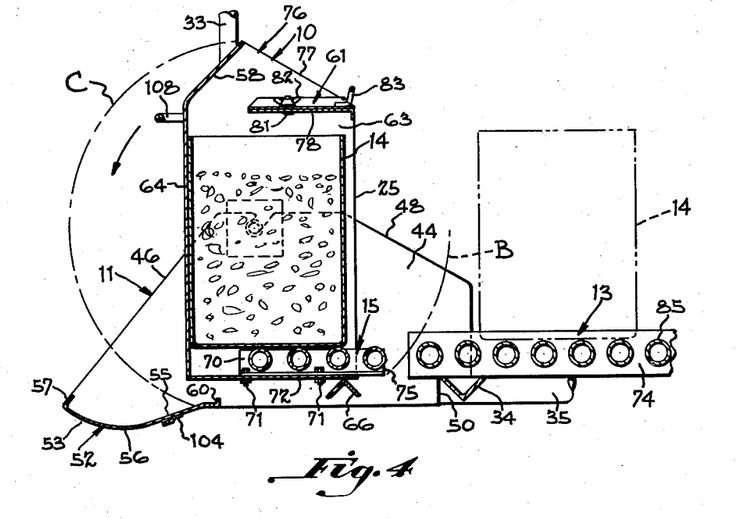
Figure 4 is a fragmentary sectional view taken along line 4—4 of Figure 3, showing the hopper and a portion of its loading conveyor, the bulk parts container having been advanced into the hopper from the conveyor.

The roll-over hopper is generally similar to the structure disclosed in the aforesaid co-pending application. Described with reference to Figure 6, the hopper is fabricated from heavy gauge sheet metal and is of welded construction throughout. It comprises a pair of spaced side walls 63—63 joined by a transverse wall 64 which resides at the front when the hopper is in its upright position. In this position, the open side 25 faces the loading conveyor 13, as previously noted. In the position of Figures 4 and 6, the hopper conveyor section 15 resides adjacent the forward end of the loading conveyor 13, such that the container 14 may be advanced directly to the hopper conveyor section to a position resting against the wall 64. It will be noted in Figure 4, that the hopper 10, which is pivotally poised upon its trunnions 12, is supported in the upright position by a transverse stop rail 66, in the form of an angle iron having its opposite ends butt welded to the side plates 44 of the base.

Figure 10:
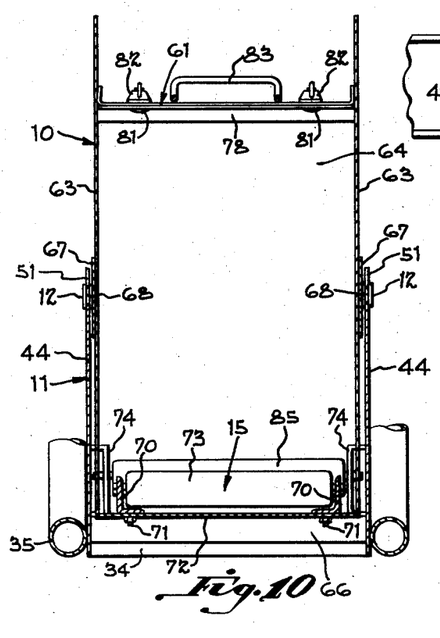
Figure 10 is a sectional view taken along line 10—10 of Figure 2, further detailing the roll-over hopper construction.

As viewed in Figure 10, each trunnion 12 consists of a pivot pin welded to a mounting pad 67 attached to the side walls 63 of the hopper, with the pins projecting outwardly along a common axis from the opposite sides of the hopper. Each pivot pin along its length is necked or grooved as at 68, the necked portion interfitting the slot 51 of the base to center the hopper transversely between the side plates of the base.

The conveyor section 15 of the hopper comprises a pair of spaced angle irons 70 bolted as at 71 to the end wall 72 of the hopper. The conveyor rollers 73 at opposite ends are rotatably journalled in the spaced angle irons 70 according to the conventional practice. It will be noted in Figure 4, that the plane of the hopper conveyor rollers is slightly below the plane of the loading conveyor rollers to facilitate transfer of the loaded containers. As viewed in Figure 10, the angle irons 70 of the hopper conveyor have their lower flanges facing one another whereas the loading conveyor 13 includes side channels 74 having their flanges facing outwardly. The width of the loading conveyor is greater than the width of the hopper conveyor which it straddles. This provides clearance, allowing the projecting endwise portion 75 of the hopper conveyor rails to clear the end of the loading conveyor, as indicated by the broken line B in Figure 4, when the hopper is swung to its inverted position.

The discharge end of the hopper comprises an open spout indicated generally at 76 delineated by the inclined flow plate 58, previously noted. The upper edges of the hopper side walls 63, as viewed in Figure 6, are inclined upwardly as at 77 from the open side 25 of the hopper to the outer edge of the flow plate; therefore, the spout comprises the flow plate 58 and the generally triangular continuations of side walls 63 which are joined to the side edges of the flow plate by welding.

The open spout includes a stop plate 78 extending across the open rearward side 25 of the hopper. To regulate the gravity feed of the parts, the shiftable gate 61 is in the form of a flat plate having a pair of slots 80 traversed by screws 81 attached to the stop plate 78. Each screw includes a wing nut 82 threaded on its outer end, whereby the gate may be locked in an adjusted position. The gate further includes a handle 83 to facilitate making the adjustment. The gate may be shifted from the fully open position of Figure 4 to the partially closed position shown in broken lines in Figure 6 by loosening the wing nuts. This prevents the more flowable parts from overflowing the retaining lip 57 at the outer end of the dispensing chute, the plate being adjusted in accordance with the character of the parts being dispensed.

Figure 11:
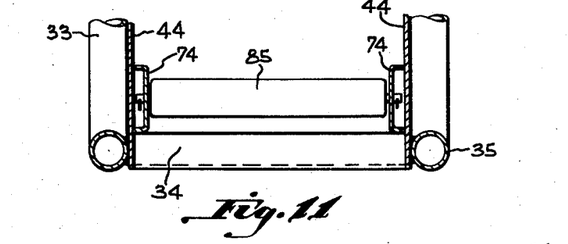
Figure 11 is a sectional view taken along line 11—11 of Figure 2, detailing the construction of the loading conveyor.

The loading conveyor 13 comprises spaced channel irons 74—74 which are supported upon the lower cross braces 34 between the limbs of the hanger, the lower webs of the channels being welded directly to the cross braces (Figure 11). The outer end of the loading conveyor 13 projects beyond the rearward limbs of the hanger for convenience in transferring a loaded container from the storage conveyor, as explained earlier. The outer end includes an additional cross brace 84 likewise welded to the side channels. The loading conveyor is of conventional design including rollers 85 rotatably journalled upon spindles which are carried by the channels at opposite ends. In the preferred form, the loading conveyor resides in a horizontal plane, such that the loaded container is pushed by hand into the hopper.

Figure 13:
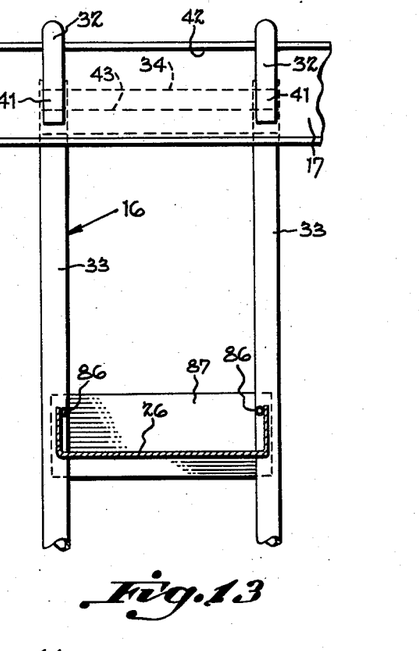
Figure 13 is an enlarged fragmentary view taken along line 13—13 of Figure 1, detailing the hanger construction and the carton rack which is supported by the hangers above the roll-over hopper.

Referring to Figure 13, each dispensing unit includes a rack or slide 26, which is fabricated from sheet metal of channel shape in cross section. The slide is mounted above the hopper and is inclined downwardly from its forward end toward the rear. The upper edges of the slide preferably are reinforced by a respective longitudinal tube 86 welded thereto, the opposite ends of the tube being butt welded to the hanger limbs. The forward end of the slide overhangs the hopper (Figure 1) and its rearward end includes a stop rail 87 extending transversely of the slide.

The storage conveyor 23 is similar to the loading conveyor, and similarly, may be arranged to support the containers directly upon the rollers; on the other hand, to facilitate handling, the containers may rest upon pallets 88 which are deposited upon the storage conveyor rollers. In the arrangement shown in Figure 14, the storage conveyor is intended for pallet handling, a pair of spaced conveyor runs 90—90 being mounted parallel with one another. In this case, the pallets 88 preferably have a length to extend transversely across both runs and may be transported with a fork-lift truck; preferably, each pallet has a width equal to the containers, such that a transverse row of containers is supported by each pallet.

Figure 14:
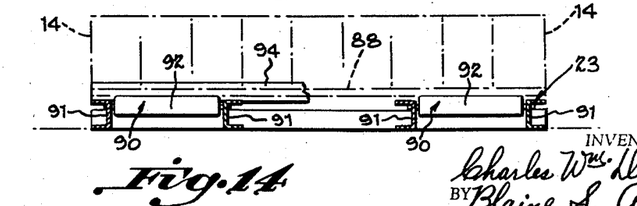
Figure 14 is an enlarged sectional view taken along line 14—14 of Figure 1, illustrating the construction of the storage conveyor.

Each storage conveyor run 90 consists of a pair of channels 91—91 having rollers 92 journalled between the channels, the upper portions of rollers residing in a plane above the channels to accommodate the pallets which may overhang the channels. To provide gravity feed from front to rear, the forward end of the conveyor runs are mounted upon a transverse angle iron 93 resting upon the floor and supporting the conveyor runs in a rearwardly inclined plane. The rearward end of the conveyor includes a stop 94 such as an angle iron which is engageable with the rearward pallet or container. Accordingly, the containers in storage flow by gravity toward the stop as they are removed from the rearward end by the tongs 31.

Figures 7, 8, 9:
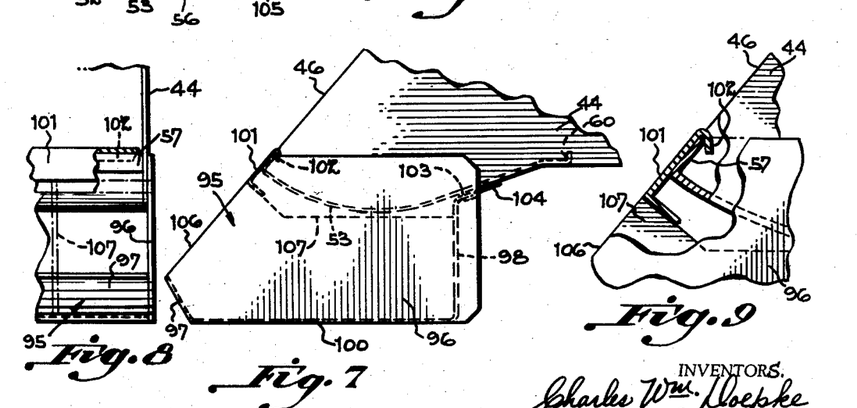
Figure 7 is a fragmentary view showing the demountable auxiliary hopper mounted on the dispensing chute.
Figure 8 is a fragmentary front view as projected from Figure 7, further illustrating the auxiliary hopper.
Figure 9 is an enlarged fragmentary view detailing the detachable connection of the auxiliary hopper to the forward end of the stationary dispensing chute.

As shown in Figures 1 and 7, the fixed dispensing chute 52 may be provided with an auxiliary parts hopper indicated generally at 95. This hopper is also fabricated from sheet metal, comprising a pair of side walls 96—96, a partial front wall 97, a rear wall 98, and a bottom panel 100. The hopper is detachably connected to the fixed chute 52 at its forward and rearward edges, the forward edge having a cross piece 101 generally of channel shape, the upper flange 102 of the channel being bent downwardly at an angle so as to provide a hook-on connection with the forward lip 57 of the fixed chute (Figure 9). The rearward edge of the hopper includes a cross flange 103 projecting rearwardly into engagement with a transverse clip 104 welded to the lower surface of the chute. The clip includes a forward limb 105 which is spaced outwardly from the surface of the chute to receive the cross flange 103. As shown in Figure 8, the side plates 96 of the auxiliary hopper resides against the outer surface of the hopper side walls 44 on opposite sides. The hopper is thus firmly attached to the chute with its forward portion projecting outwardly beyond the end of the chute as at 106, thus presenting the parts within the hopper to be dipped out conveniently by hand. The hopper may further include one or more dividers 107 which delineate transverse compartments for assorted parts.

The auxiliary hopper is attached to the chute by slipping the rearward cross flange 103 into engagement with the clip 104, then bringing the angular flange 102 into engagement with the lip 57. This hopper is intended for very small parts which mate with the larger parts carried by the roll-over hopper, such as small washers, nuts, or the like. Thus, if a fairly large part, such as a mounting plate or bracket is being attached at one of the stations, these parts are dispensed from the roll-over hopper, while the necessary nuts and washers, which accompany that part, may be supplied by the compartments of the auxiliary hopper. The auxiliary hopper imparts flexibility to the assembly line and is simply omitted at such stations where it is not required.

It will be noted in Figure 4, that in its upright loading position, the roll-over hopper 10 is slightly over-balanced toward the right, since the common axis of the trunnions 12 is located toward the left relative to the mass of the hopper. Accordingly, the hopper remains in upright position with its bottom resting upon the stop rail 66. As the parts container 14 is advanced into the hopper, the rail 66 resists any tendency of the hopper to rotate under the weight load of the container. When the hopper is advanced to its final position against hopper wall 64, the major mass of the loaded container is below the trunnion axis, the minor portion being located above the axis. Accordingly, the loaded hopper remains stabilized by stop rail 66; however, by virtue of the weight distribution, the loaded hopper may be pivoted toward its inverted position without a great deal of effort. Upon being swung to its inverted position, the rearward end of the hopper conveyor 15 swings through the arc indicated by the broken line B in Figure 4, and the spout 58 of the hopper swings through an arc C to the fixed dispensing chute 52. To facilitate manipulation of the hopper, a handle 108 formed of rod stock is welded directly to the upper portion of the transverse wall 64.

As the hopper swings downwardly to the dispensing position, the parts container 14 within it slides along the wall 64 until its open end contacts stop plate 78, whereupon the parts flow from the container, through the restricted passageway delineated by the gate 61, then down the hopper spout 58 to the open dispensing chute 52 (Figure 5). In this position, the parts within the lower portion of the hopper over-balance the hopper in its inverted position, the hopper being maintained in this position by engagement of its spout 58 with the inclined portion 55 of chute 52.

As indicated in the broken line D of Figure 5, the mid-point of the hopper conveyor 15, in the direction of its length, approximately coincides with the axis of the trunnions when the hopper is inverted, while the stop plate and gate assembly 61 resides toward the left of the axis. The weight distribution of these parts thus overbalances the hopper slightly in its inverted position; therefore, the hopper remains inverted after the container is emptied. When the user pivots the hopper back to its upright position for replacement of the empty container, a residual supply of parts will remain in the stationary dispensing chute 52; therefore, the assembly operations may be continued without interruption while the hopper is being reloaded.

It will be noted in Figure 1, that the common axis of the trunnions 12 is located to the rearward side of the forward vertical limbs 33, which support the forward end of the dispenser unit. Hence, the weight load of the hopper is primarily carried by the forward limbs, while the loading conveyor 13, which extends rearwardly in cantilever fashion, tends to counterbalance the suspended unit. Accordingly, even though no load is supported by the conveyor 13, its overhanging weight load tends to stabilize the entire unit. When several loaded containers are resting upon the loading conveyor between the forward and rearward limbs, then the stability of the unit is increased.

Having described our invention; we claim:

1. A self-contained parts dispenser adapted to feed parts from an open parts container at an elevation convenient to an operator, said dispenser being suspended from an overhead support, said dispenser comprising, a pair of hangers spaced apart from one another, each of said hangers having a pair of vertical limbs joined by a horizontal connecting section, respective attachment means at the upper end of each of said limbs, said attachment means connected to said support and suspending the hangers with the horizontal connection thereof spaced above a floor level, a roll-over hopper pivotally mounted between said hanger limbs at a forward end thereof and above said horizontal connecting sections, a fixed dispensing chute projecting outwardly of the hangers in a plane below said connecting sections of the hangers, said fixed dispensing chute having a bottom surface which is inclined downwardly from said hangers, said surface leading to an upwardly curved forward section, said hopper confining an open parts container and being selectively pivoted from an upright loading position to an inverted dispensing position, said hopper having an open spout which resides at the upper end of the hopper when in said upright position, said spout swinging through an arc to a dispensing position, said open spout having a downwardly inclined flow plate overlying the bottom surface of the fixed chute when in said dispensing position, said flow plate forming a continuation of said fixed dispensing chute when in said dispensing position, whereby the parts in the said open container flow by gravity through the open spout of the hopper to the upwardly curved forward section of the dispensing chute, a loading conveyor mounted between said hangers and generally parallel with said connecting sections at the lower portion of the hangers, said loading conveyor having a forward end residing adjacent the roll-over hopper and extending rearwardly thereof, whereby said loading conveyor counter-balances the weight load of the roll-over hopper and stabilizes said suspended dispenser relative to the overhead support, said loading conveyor advancing a loaded parts container into the roll-over hopper when the hopper is pivoted to said upright loading position.

2. A self-contained parts dispenser adapted to feed parts from an open container at an elevation convenient to an operator, said dispenser being suspended from a pair of longitudinal overhead rails, said dispenser comprising, a pair of hangers spaced apart from one another, each of said hangers having a pair of vertical limbs joined by a horizontal connecting section, a respective hook element at the upper end of each of said limbs, the hooks of each hanger being shiftably engaged over one of said pair of overhead rails and suspending the hanger from the rails in a plane transverse to said longitudinal rails, said hook elements adapting the hangers to be shiftably located along said overhead rails, a roll-over hopper pivotally mounted between said hangers at a forward end thereof, a fixed dispensing chute mounted between the hangers and projecting outwardly beyond the limbs at the lower portion thereof, said hopper confining an open parts container and being selectively pivoted from an upright loading position to a downwardly inclined dispensing position, said hopper having an open spout which resides at the upper end of the hopper when in said upright position, said spout swinging through an arc to a position adjacent the fixed chute when in said dispensing position, whereby the parts in the said open container flow by gravity through the open spout of the hopper to the fixed dispensing chute, a loading conveyor mounted between said hangers generally parallel with the horizontal connecting sections thereof, said loading conveyor having a forward end residing adjacent the roll-over hopper and extending rearwardly thereof, whereby said loading conveyor counter-balances the weight load of the roll-over hopper, said loading conveyor advancing a loaded parts container into the hopper when the hopper is in said upright loading position, and a storage conveyor mounted beneath the hangers and extending generally parallel and coextensive with the loading conveyor, the storage conveyor being arranged to store a plurality of loaded parts containers beneath the suspended parts dispenser to be elevated from the storage conveyor to the loading conveyor for advancement into the roll-over hopper.

3. A self-contained parts dispenser adapted to dispense parts from an open parts container at an elevation convenient to an operator, said dispenser being suspended from a pair of overhead rails, said dispenser comprising, a pair of hangers spaced apart from one another, each of said hangers having a pair of vertical limbs joined by a horizontal connecting section, a respective hook mounted at the upper end of each of said limbs, the hooks of each limb being engaged over said rails with said hangers extending at right angles to said rails, said hooks suspending the hangers for shiftable motion along said rails, a hopper base mounted between said pair of hangers adjacent the limbs at the forward end of the hangers, a hopper pivotally mounted upon said base, said hopper selectively residing in an upright loading position and pivoting to an inverted dispensing position, a loading conveyor extending between said hangers rearwardly from said hopper base, said hopper having an open side facing the forward end of said loading conveyor when in said upright position and having rotatable rollers mounted in one end thereof, said hopper rollers residing adjacent the forward end of said loading conveyor when the hopper is in said upright loading position, whereby a parts container is advanced along the loading conveyor, through the open side of the hopper upon the rollers therein to be inverted with the hopper upon pivotal motion of the hopper to said inverted dispensing position, said hopper having an open delivery spout on the end thereof opposite said rollers, a fixed dispensing chute projecting in fixed position outwardly from said hopper base, said hooks and hangers supporting the fixed chute at an elevation convenient to an operator, the open delivery spout of the hopper swinging in an arc downwardly into contact with said fixed chute as the hopper swings to said inverted dispensing position, causing the parts in said container to flow by gravity from the hopper spout into the fixed chute to be dipped therefrom by an operator.

4. A self-contained parts dispenser adapted to dispense parts from an open parts container at an elevation convenient to an operator, said dispenser being suspended from a pair of overhead rails, said dispenser comprising a pair of hangers spaced apart from one another, each of said hangers having a pair of vertical limbs joined by a horizontal connecting section, a respective hook mounted at the upper end of each of said limbs, the hooks of each limb being engaged over said rails with said hangers extending at right angles to said rails, said hooks suspending said hangers for shiftable motion along said rails, a hopper base mounted between said pair of hangers adjacent the limbs at the forward end of the hangers, a hopper pivotally mounted upon said base and between said hangers, said hopper selectively residing in an upright loading position and pivoting to an inverted dispensing position, a loading conveyor extending between said hangers rearwardly from said hopper base, said hopper having an open side facing the forward end of said loading conveyor when in said upright position and having rotatable rollers mounted in one end thereof, said hopper rollers residing adjacent the forward end of said loading conveyor when the hopper is in said upright loading position, whereby a parts container is advanced along the loading conveyor, through the open side of the hopper upon the rollers therein to be inverted with the hopper upon pivotal motion of the hopper to said inverted dispensing position, said hopper having an open delivery spout on the end thereof opposite said rollers, an open dispensing chute projecting in fixed position outwardly from said hopper base, said hooks and hangers supporting the fixed chute at an elevation convenient to an operator, the open delivery spout of the hopper swinging in an arc downwardly into contact with said fixed chute as the hopper swings to said inverted dispensing position, causing the parts in said container to flow by gravity from the hopper spout into the fixed chute to be dipped therefrom by an operator, said fixed chute extending forwardly and downwardly from said hopper spout and including a partial front wall which confines a residual quantity of parts available to the operator when said hopper is pivoted to said upright loading position.

5. A self-contained dispenser adapted to feed parts from an open parts container at an elevation convenient to an operator, said dispenser being suspended from a pair of longitudinal overhead rails, said dispenser comprising, a pair of hangers spaced apart from one another, each of said hangers providing a pair of spaced vertical limbs, joined by a horizontal connector at the lower ends of the limbs, a respective hook at the upper end of each of said limbs, said hooks engaged over said overhead rails with the hangers suspended generally at right angles to said rails, a roll-over hopper pivotally mounted between said hangers adjacent the forward end thereof, the said hooks suspending the hangers and roll-over hopper for shiftable motion along said overhead rails, said hopper selectively pivoting to an upright loading position or to a downwardly inclined dispensing position, said hopper having a plurality of conveyor rollers journalled in one end thereof and an open delivery spout at the opposite end thereof, a loading conveyor mounted between said hangers and extending rearwardly from said hopper, the rollers of said hopper residing at the forward end of said conveyor when in said upright loading position, whereby a parts container is advanced along the loading conveyor and upon the hopper rollers to be inverted with said hopper, a fixed dispensing chute projecting outwardly between the limbs at the forward end of said hangers below said hopper, said hopper spout swinging through an arc downwardly into engagement with said fixed chute when the hopper is pivoted to said inverted dispensing position, whereby the parts in said open container flow by gravity down the hopper spout into fixed chute to be dipped therefrom by an operator, a detachable hopper including a transverse flange at the rearward end thereof, a retainer clip element residing beneath the fixed chute and detachably engaging said transverse flange, the forward edge of the detachable hopper including a downwardly inclined element detachably engageable over the forward edge of the fixed chute, said auxiliary hopper being detached from the fixed chute by elevating the forward end thereof to disengage the said inclined element, adapting the transverse flange thereof to be disengaged from said clip by shifting the hopper forwardly relative to the fixed chute.

6. In a self-contained dispenser adapted to be suspended from an overhead support at an elevation above a floor, a hanger structure having a pair of generally horizontal sections spaced apart from one another, said hanger structure suspended from said overhead support, a hopper base comprising a pair of spaced side plates rising from said horizontal sections, said plates each having a portion projecting outwardly beyond the forward end of the hanger structure, a bottom plate extending transversely between said side plates at the lower portion thereof, said bottom plate projecting forwardly beyond the forward end of the hanger structure and being inclined downwardly and outwardly, the side plates and bottom plate delineating a fixed parts dispensing chute, a roll-over hopper, said roll-hopper having trunnions projecting outwardly on opposite sides thereof along a common axis extending transversely of said plates, said axis being located above the bottom plate of said fixed chute, the upper portion of the side plates rotatably journalling said trunnions, said hopper selectively pivoting about said common axis from a generally upright loading position to an inverted parts dispensing position, said hopper when in said upright position having an end wall residing above the bottom plate of the fixed chute to support a parts container in the hopper, the opposite end of said hopper having an open delivery spout, said spout swinging in an arc downwardly into contact with the bottom plate of said fixed chute upon inversion of the hopper, whereby the parts in said container flow by gravity from the open container, delivery spout and into the fixed chute to be dipped therefrom by an operator.

7. In a self-contained dispenser adapted to be suspended from an overhead support at an elevation above a floor, a hanger structure having a pair of spaced horizontal support elements, said hanger structure suspended from said support, a hopper base comprising a pair of spaced side plates rising from said horizontal support elements, said plates each having a portion projecting outwardly beyond the forward end of the hanger structure, a bottom plate extending transversely between said side plates at the lower portion thereof, said bottom plate projecting forwardly beyond the forward end of the hanger structure and being inclined downwardly and outwardly, said bottom plate including a parts retaining lip at the outer end thereof, said side plates and bottom plate delineating a fixed chute, a roll-over hopper, said roll-over hopper having trunnions projecting outwardly on opposite sides thereof along a common axis extending transversely of said plates, said axis being located above the bottom plate of the fixed chute a distance substantially one-half the length of the hopper, said trunnions rotatably journalled in said side plates, said hopper selectively pivoting about said common axis from a generally upright loading position to an inverted parts dispensing position, said hopper when in said upright position having an end wall residing above the bottom plate of the fixed chute to support a parts container in the hopper, the opposite end of said hopper having an open delivery spout comprising a pair of side walls parallel with the side plates of said hopper base and an inclined flow plate joining said side walls, said spout swinging in an arc downwardly upon inversion of said hopper, the flow plate of said spout thereupon contacting the bottom plate of said fixed chute and forming a continuation thereof, whereby the parts in said open container flow by gravity down the flow plate of the hopper spout into the fixed chute to be dipped therefrom by an operator, the retaining lip of said fixed chute confining a residual quantity of parts available to the operator when said hopper is pivoted back to said upright loading position.

8. In a self-contained dispenser adapted to be suspended from an overhead support at an elevation above a floor, a hanger structure suspended from said overhead support, a hopper base carried on the hanger structure, the hopper base comprising a pair of spaced side plates rising upwardly from the lower portion of the hanger structure, said plates each having a portion projecting outwardly beyond the forward end of the hanger structure, a bottom plate extending transversely between said side plates at the lower portion thereof, said bottom plate including a parts retaining lip at the outer end thereof, said side and bottom plates delineating a fixed dispensing chute, a roll-over hopper, said roll-over hopper having trunnions projecting outwardly on opposite sides thereof along a common axis extending transversely of said plates, said axis being located above the said bottom plate, said trunnions being journalled in said side plates, said hopper selectively pivoting about said common axis from a generally upright loading position to an inverted parts dispensing position, said hopper when in said upright position having an end wall residing above the bottom plate of the fixed chute to support a parts container in the hopper, the opposite end of said hopper having an open delivery spout, said spout swinging in an arc downwardly and contacting the bottom plate of said fixed chute upon inversion of the hopper, whereby the parts in said container flow by gravity through the spout into the fixed chute to be dipped therefrom by an operator, a detachable hopper including a pair of said plates spaced to embrace the side plates of the fixed chute, the detachable hopper including a rear wall having an outwardly projecting flange, a retainer clip element on the bottom plate of the fixed chute detachably engaging said projecting flange, the forward edge of the detachable hopper including a downwardly inclined element detachably engageable over the retainer lip of the fixed chute, said detachable hopper being demounted by elevating the forward end thereof to disengage the said inclined element, adapting said outwardly projecting flange to be disengaged from said retainer clip.

9. In a self-contained dispenser adapted to be suspended from a pair of spaced overhead rails to dispense parts at an elevation above a floor, a pair of hangers, each of said hangers being generally of U-shaped configuration providing a pair of vertical limbs spaced apart a distance corresponding to the spacing of the rails, a roll-over parts hopper pivotally mounted between the forward ends of said hangers, a fixed dispensing chute projecting outwardly from the forward end of said hangers below the hopper, said hopper confining the parts and being selectively pivoted from an upright loading position to a downwardly inclined dispensing position, said hopper having an open delivery spout which swings to a position adjacent the fixed chute when the hopper is pivoted to the inclined dispensing position, whereby the parts in the hopper flow from the delivery spout to said fixed chute, a respective hook projecting from the upper portion of each of said limbs, each of said hooks projecting outwardly from the limb and having a downwardly curved portion at the outer end thereof, the hooks of each hanger passing across a respective rail overhead, and a locating element on each of said limbs on the side opposite said curved portion of the hook, said locating element and curved portion of the hook engaging opposite sides of an overhead rail, whereby said curved portion is effective to cam the hook forwardly across the rail upon engagement of said hook, thereby to shift said locating element into engagement with the rail and locate the limbs of the hangers in alignment with the rails, said hooks providing a slidable connection whereby the self-contained dispenser is shiftable longitudinally along the overhead rails to a selected position.

References Cited in the file of this patent
UNITED STATES PATENTS

| | | |
|---|---|---|
| 2,758,732 | Herzog et al. | Aug. 14, 1956 |
| 2,778,504 | Byrne | Jan. 22, 1957 |